(12) United States Patent
Tanaka

(10) Patent No.: US 6,507,878 B1
(45) Date of Patent: Jan. 14, 2003

(54) BUS SNOOP CONTROL CIRCUIT

(75) Inventor: Yukihiro Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/449,469

(22) Filed: Nov. 29, 1999

(30) Foreign Application Priority Data

Nov. 30, 1998 (JP) .......................................... 10-340623

(51) Int. Cl.⁷ .................. G06F 13/00; G06F 12/00; G06F 11/00
(52) U.S. Cl. .................. 710/100; 710/107; 711/146
(58) Field of Search .................. 710/100, 107; 711/141, 144, 146; 714/1, 5; 712/225; 340/825.06

(56) References Cited

U.S. PATENT DOCUMENTS 5,072,369 A * 12/1991 Theus et al.
5,829,040 A * 10/1998 Son
5,974,511 A * 10/1999 Boddu et al.
6,151,641 A * 11/2000 Herbert
6,173,368 B1 * 1/2001 Krueger et al.

* cited by examiner

*Primary Examiner*—Gopal C. Ray
(74) *Attorney, Agent, or Firm*—Sughrue Mion, PLLC

(57) ABSTRACT

A bus snoop control circuit of the present invention, which is connected to a bus, includes a first circuit which determines whether or not the bus snoop control circuit snoops data based on an address obtained from the bus. A bus system of the present invention includes a bus, a plurality of circuit boards and a plurality of first circuits. Each of the first circuits is provided in each of the circuit boards and determines whether or not corresponding one of the circuit boards snoops data based on an address obtained from the bus. A method for controlling a snoop in a circuit board connected to a bus of the present invention includes obtaining an address from the bus and determining whether or not the board snoops data based on the address.

18 Claims, 7 Drawing Sheets

| IDENTIFICATION INFORMATION | A15 | A14 | RESPONSE | SNOOP |
|---|---|---|---|---|
| 0 | 0 | 0 | 0 | — |
| 0 | 0 | 1 | 1 | — |
| 0 | 1 | 0 | 0 | — |
| 0 | 1 | 1 | 1 | — |
| 1 | 0 | 0 | 0 | — |
| 1 | 0 | 1 | 0 | — |
| 1 | 1 | 01 | 1 | — |
| 1 | 1 | 1 | 0 | * |

| IDENTIFCATION INFORMATION | A15 | A14 | A13 | RESPONSE | SNOOP |
|---|---|---|---|---|---|
| 0 | 0 | 0 | 0 | 0 | — |
| 0 | 0 | 0 | 1 | 1 | — |
| 0 | 0 | 1 | 0 | 0 | — |
| 0 | 0 | 1 | 1 | 1 | — |
| 0 | 1 | 0 | 0 | 0 | — |
| 0 | 1 | 0 | 1 | 1 | — |
| 0 | 1 | 1 | 0 | 0 | — |
| 0 | 1 | 1 | 1 | 1 | — |
| 1 | 0 | 0 | 0 | 0 | — |
| 1 | 0 | 0 | 1 | 0 | — |
| 1 | 0 | 1 | 0 | 1 | — |
| 1 | 0 | 1 | 1 | 0 | * |
| 1 | 1 | 0 | 0 | 0 | — |
| 1 | 1 | 0 | 1 | 0 | — |
| 1 | 1 | 1 | 0 | 1 | — |
| 1 | 1 | 1 | 1 | 0 | * |
| 2 | 0 | 0 | 0 | 0 | — |
| 2 | 0 | 0 | 1 | 0 | — |
| 2 | 0 | 1 | 0 | 0 | — |
| 2 | 0 | 1 | 1 | 0 | — |
| 2 | 1 | 0 | 0 | 1 | — |
| 2 | 1 | 0 | 1 | 0 | * |
| 2 | 1 | 1 | 0 | 0 | * |
| 2 | 1 | 1 | 1 | 0 | * |

BUS SNOOP CONTROL CIRCUIT

BACKGROUND OF THE INVENTION

The present invention relates to a bus snoop control circuit, and more particularly, to a bus snoop control circuit which provides a computer system or the like with a snooping function.

Snooping in computer systems means the operation of monitoring a write access to a memory to ensure cache coherency in a multiprocessor system to which a cacheable, central processing unit (CPU) is mounted. In addition, in Peripheral Component Interconnect (PCI) buses, the computer system can be provided with a Video Graphics Array (VGA) palette snoop.

The VGA palette snoop is used in a system which has two graphic controller boards, where one graphic controller board is VGA-compatible, while the other is VGA-incompatible. The VGA-incompatible board monitors the write access to VGA palette registers of the VGA-compatible board and writes the write data to its own register without responding to the bus.

In the VGA palette snoop, the board determines whether or not it snoops the data based on information contained in a certain bit (VGA palette snoop bit) in the register which is provided inside the board. If the board determines that it snoops the data, the data which has been written to the specific address is snooped.

However, in the method of snooping the write data to the specific device, if it is necessary to change the board in which the snooping should be performed to the board in which the snooping should not be performed, there is a problem because it is necessary to rewrite the bit, which designates whether or not the present board is the board which the snooping function should be performed, before the data is written to the address for the snoop.

SUMMARY OF THE INVENTION

An object of the invention is to provide a bus snoop control circuit which changes the board in which the snooping should be performed and the board in which the snooping should not be performed.

According to one aspect of the present invention, a bus snoop control circuit connected, to a bus is provided which includes: a first circuit which determines whether or not the bus snoop control circuit snoops data based on an address obtained from the bus.

According to another aspect of the present invention, a bus system is provided which includes: a bus; a plurality of circuit boards; and a plurality of first circuits each of which is provided in each of the circuit boards and determines whether or not a corresponding one of the circuit boards snoops data based on an address obtained from the bus.

According to another aspect of the present invention, a method for controlling a snoop in a circuit board connected to a bus, is provided which includes: obtaining an address from the bus; and determining whether or not the board snoops data based on the address.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

A first embodiment of the present invention will be described in detail below.

Figure 1:
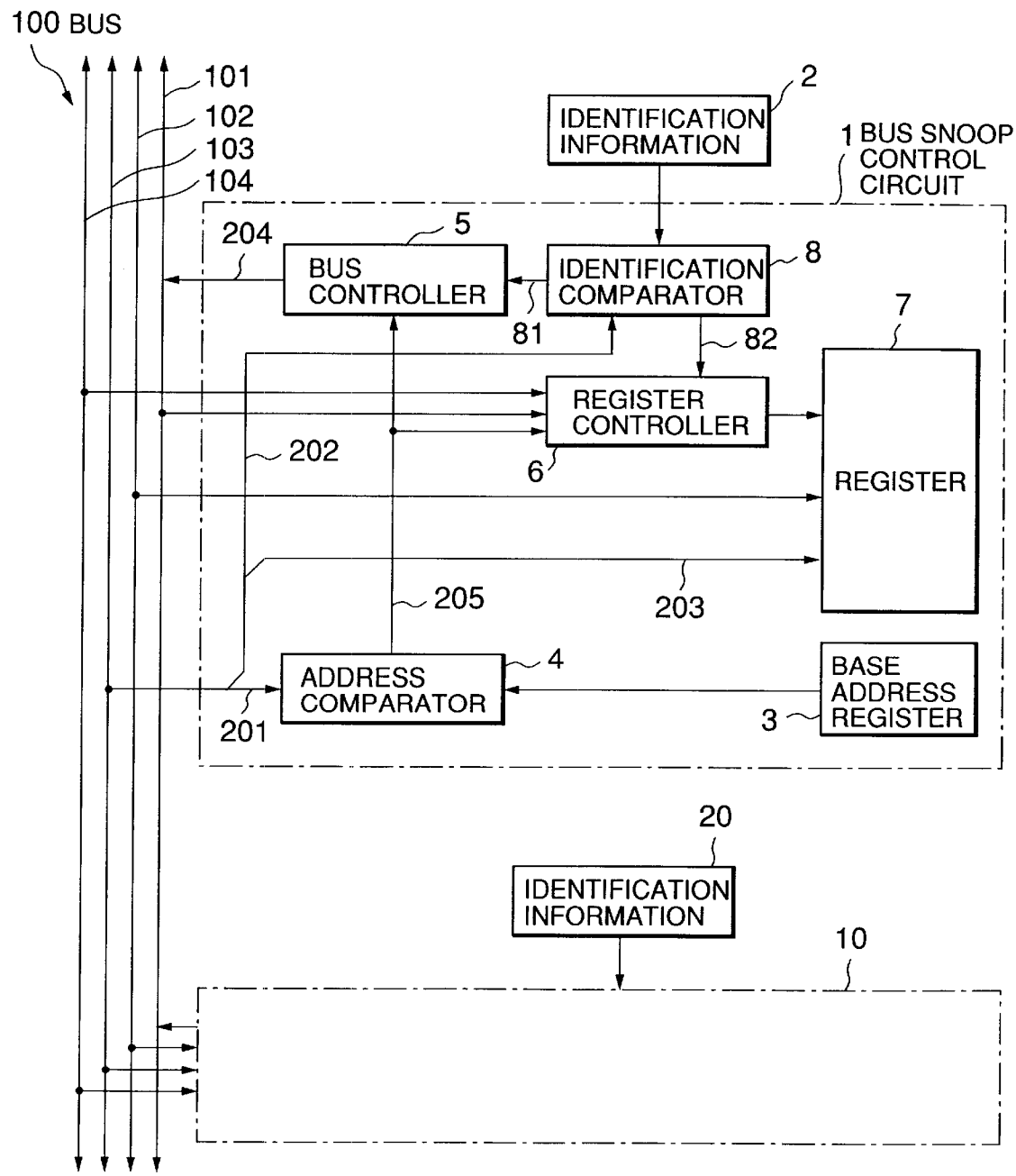
FIG. 1 is a block diagram of the first embodiment of the present invention.

Referring to FIG. 1, a bus snoop control circuit 1 includes a base address register 3, an address comparator 4, a bus controller 5, a register controller 6, a register 7, :and an identification comparator 8. In this embodiment, bus snoop control circuit 1 is implemented as an electronic circuit board.

Bus: snoop control circuit 1 fetches data, which will be written to a certain address, in only the electronic circuit board which is specified by the specific bit information of the address. When a plurality of electronic circuit boards are connected to a bus, bus snoop control circuit 1 on each board determines whether or not it should respond to the write access on the bus (i.e., whether or not response signals are output to a control signal line of a bus) based on both of the bit information of the address and an identification information which has been assigned to the electronic circuit board. Thus, only one electronic circuit board always responds to the bus, and each of other electronic circuit boards snoops the data.

Bus snoop control circuits 1 are connected to a bus 100. Bus 100 includes a control signal line 101, a data signal line 102, an address signal line 103 and a command signal line 104.

FIG. 1 shows the situation in which two electronic circuit boards are connected to the bus. Each electronic circuit board includes a bus snoop control circuit 1. A write access reaches to registers 7, which are respectively provided inside the electronic circuit boards 1, through the bus from a host side. Then, a part of address signal line 103 (a base address 201) is compared to the contents of the base address register 3 by an address comparator 4. If a match is obtained, then each of a bus controller 5 and a register controller 6 are activated. Which of the two electronic circuit boards 1 and 10 is accessed is determined by two bits of information 202 in the addresses (the number of bits is equal to the number of electronic circuit boards) which correspond to the two electronic circuit boards. Then, the electronic circuit board in which the address bit is set to "1" is accessed.

Identification information 2 is coupled to electronic circuit boards 1 and 10. Identification information 2 is used for identifying the individual electronic circuit boards. Each electronic circuit board 1 is assigned a different identification.

Address comparator 4 compares the contents of the base address register 3 with base address 201 as a part of address signal line 103. Address comparator 4 reports the comparison result, which shows whether or not the contents of bus address register 3 is identical to base address 210, to bus controller 5 and register controller 6 through a base address coincidence signal line 205.

Identification comparator 8 compares identification information 2 and a board selection address 202 as a part of address signal line 103, and determines whether or not bus controller 5 and register controller 6 should be activated. Identification comparator 8 activates bus controller 5 and register controller 6 based on the comparison between the content of identification information 2 and board selection address 202. Identification comparator 8 issues an operation instruction to bus controller 5 and register controller 6.

If command signal line 104 designates a write access, address comparator 4 outputs a match as the comparison result, and the operation instruction has been issued from identification comparator 8, then register controller 6 writes the data on data signal line 102 to the address of register 7, which is designated by register address 203 (a part of address signal line 103) based on the timing of control signal line 101. Register controller 6 is activated if the bit of address 202 corresponding to the identification information is "1".

If address comparator 4 outputs a match as the comparison result and the operation instruction is issued from identification comparator 8, bus controller 5 returns the response signals against the access on control signal line 101. When one electronic circuit board is selected based on address 202, bus controller 5 of that electronic circuit board is activated. When two electronic circuit boards are selected, however, one of them is activated. Bus controller 5, which has been activated, responds to the write access through the bus.

Next, the operation of the embodiment will be described.

It is assumed that electronic circuit boards 1 and 10 are connected to bus 100. Identification information 2 of electronic circuit boards 1 and 10 are set to "0" and "1", respectively.

The following example describes when data is written to electronic circuit board 1 having identification information 2="0". When the access to that electronic circuit board 1 begins, command signal line 104 designates a write.

Figures 2, 3:
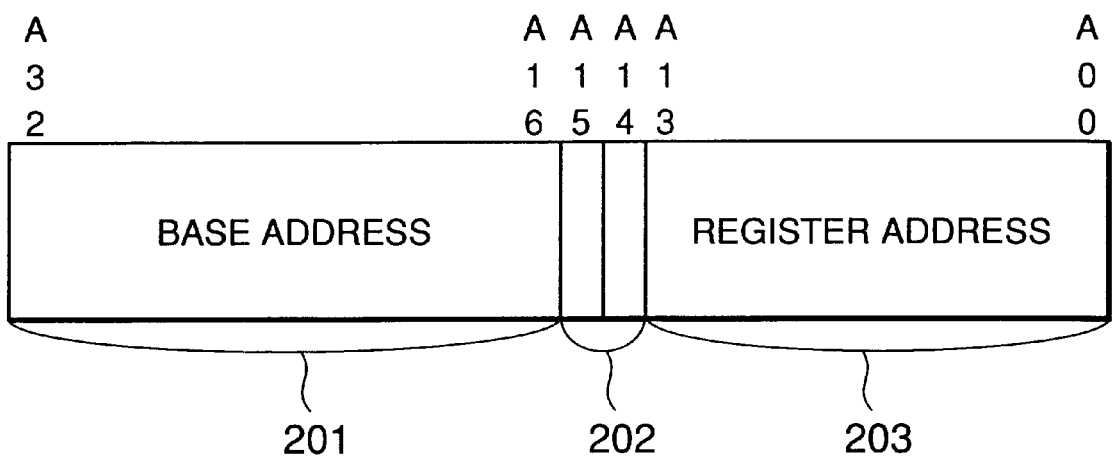
FIG. 2 is a diagram showing an address format when two electronic circuit boards are connected to a bus.
FIG. 3 is a diagram showing a truth table of an identification comparator in the write operation when two electronic circuit boards are connected to a bus.

FIG. 2 shows the address format of address signal line 103 when electronic circuit boards 1 and 10 have been connected to bus 100. It should be noted that this format is only an example used to explain the present embodiment and is not intended to be construed in a limiting sense with respect to the address format in the present invention.

The address comprises 32 bits and includes a base address 201, a board selection address 202 and a register address 203. Base address 201 (A32 to A18) represents the specific address space in the system or the electronic circuit board and is compared with the values stored in the base address register 3 by address comparator 4. The values in the base address register 3 are set based on the memory map on the system.

The present embodiment assumes that the address of the space on the basis of which the internal register 7 of the electronic circuit board 1 is accessed is assigned. If address comparator 4 determines that base address 201 of address signal line 103 is identical to the contents of the base address register 3, address comparator 4 sets the value of base address coincidence signal line 205 to "1". On the other hand, if address comparator 4 determines that base address 201 is not identical to the contents of the base address register 3, address comparator 4 sets the value of base address coincidence signal line 205 to "0".

Board selection address 202 includes bits A15 and A14. Bits A15 and A14 correspond to the electronic circuit boards 1 and 10 which are connected to the bus. In this embodiment, it is assumed that A14 corresponds to the electronic circuit board 1 having identification information 2="0", and A15 corresponds to the electronic circuit board 1 having identification information 2="1". If one of bits A15 and A14 are "1", the corresponding electronic circuit board is accessed. However, even if the value of base address coincidence signal line 205 is "1", when the 2 bits A15 and A14 are both "0", none of the electronic circuit boards 1 and 10 on the bus are accessed.

Figure 4:
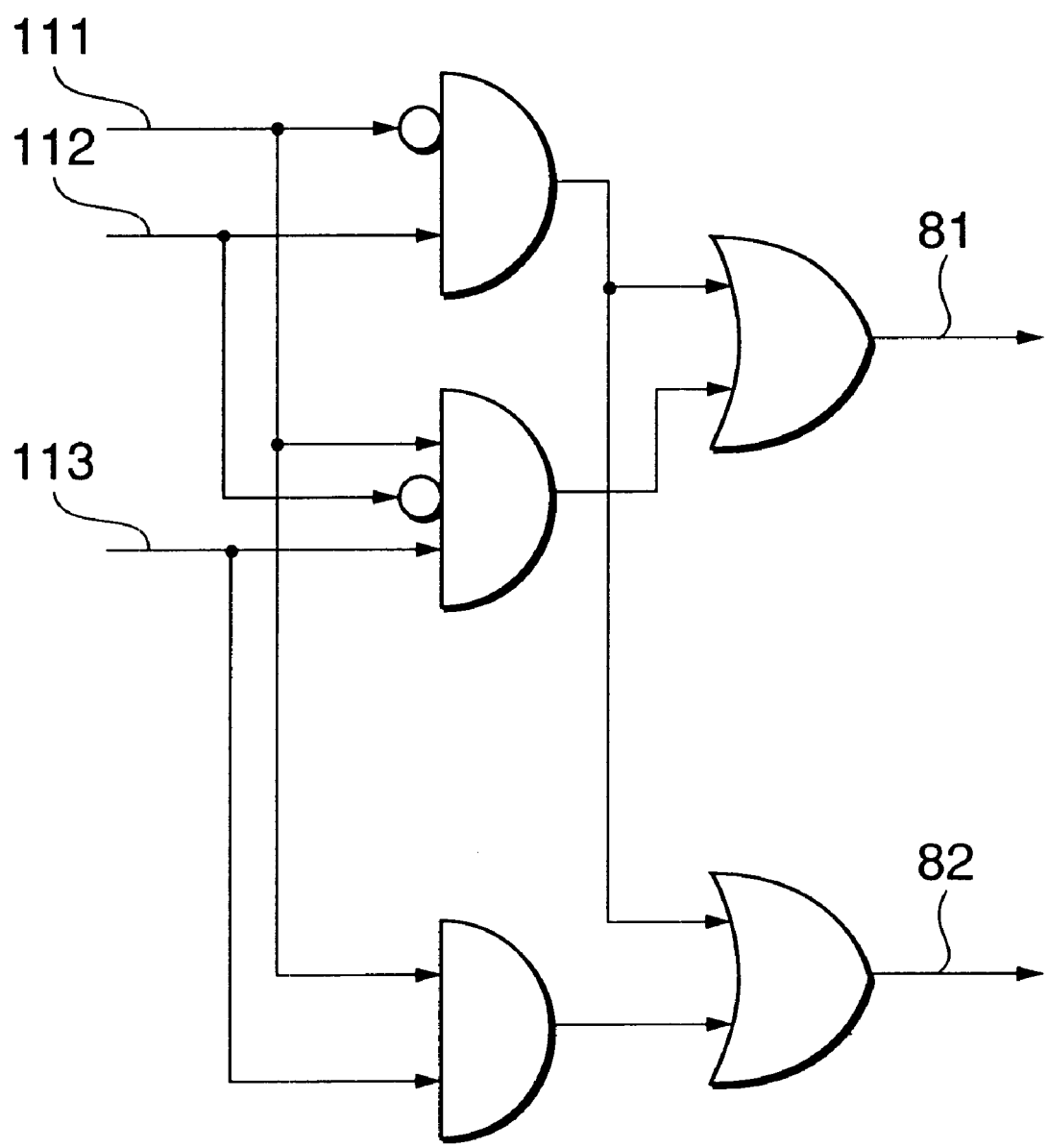
FIG. 4 is a block diagram of the identification comparator.
Figure 5:
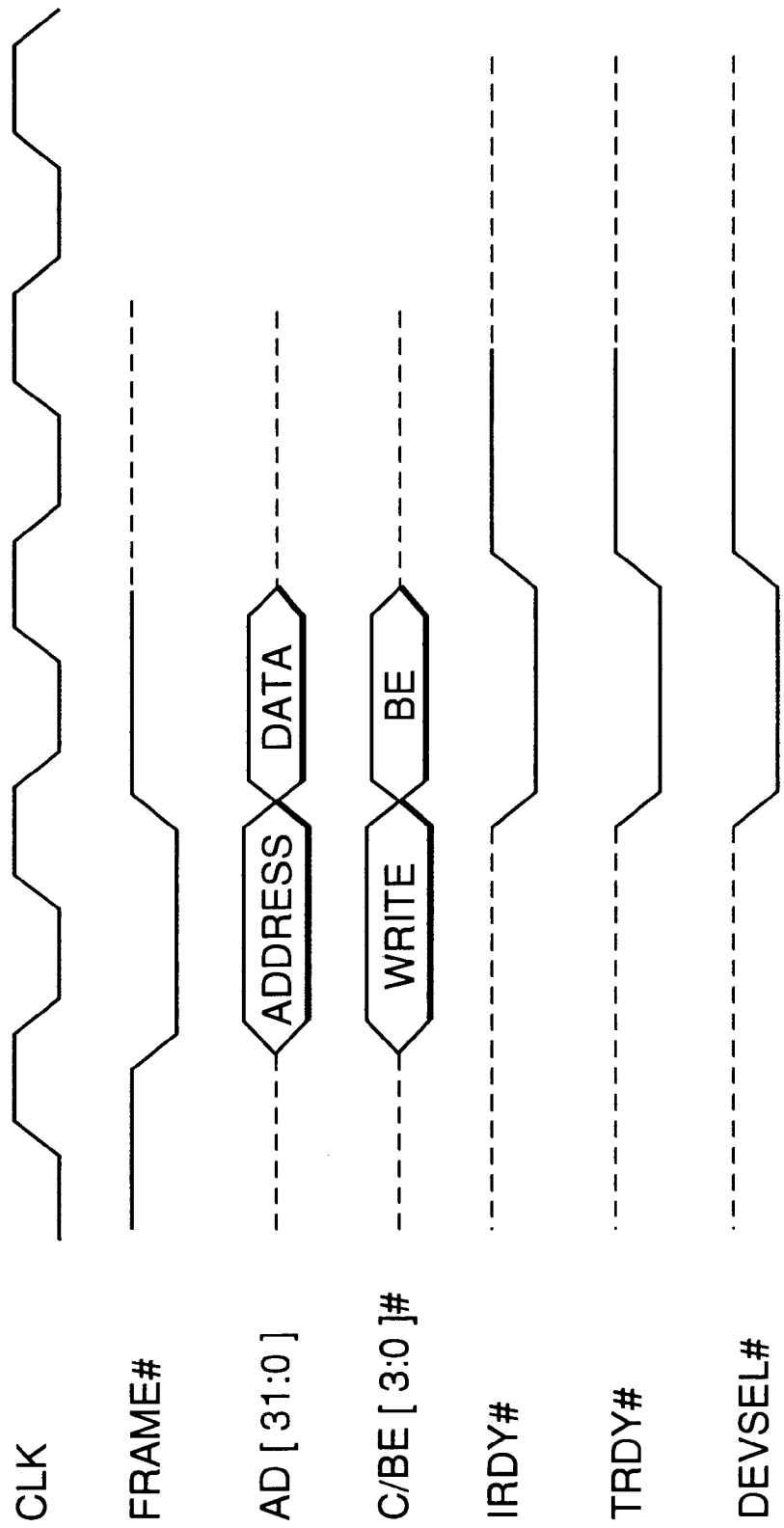
FIG. 5 is a timing diagram when a PCI bus is used.

When the access to the electronic circuit board 1 having identification information 2="0" is considered, the value of board selection address 202 is "01". Board selection address 202 is input to identification comparator 8. Since the value of identification information 2 is "0", a bus control designation line 81 and a register control designation line 82 both become active, i.e., the value of bus control designation line 81 and register control designation line 82 become "1". The truth table of identification comparator 8 in the write operation when the two electronic circuit boards 1 are connected to the bus is shown in FIG. 3 and the circuit configuration of identification comparator 8 is shown in FIG. 4.

In FIG. 3, the identification information is the identification value for the electronic circuit board set based on identification information 2. Each of reference symbols A15 and A14 designate board selection address 202. A response entry shows whether or not the electronic circuit board responds to bus 100 during the write operation. When the response entry is "1" the response to bus 100 is performed. When the response entry is "0", there is no response to bus 100. A snoop entry shows whether or not the snoop operation of the write data is performed. Symbol "*" means the snoop operation is performed, "–" means no snoop operation is performed.

Figures 7, 8:
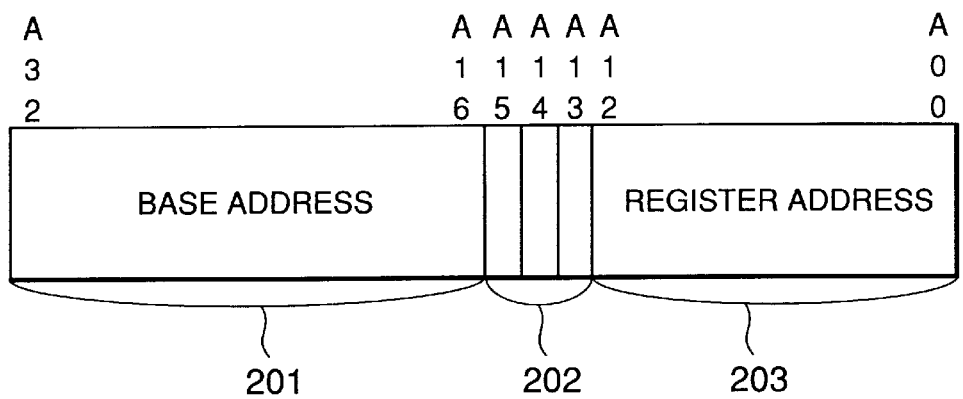
FIG. 7 is a diagram showing an address format when three electronic circuit boards are connected to a bus.
FIG. 8 is a diagram showing a truth table of an identification comparator in the write operation when three electronic circuit boards are connected to a bus.

According to an entry of identification information="0", the response is "1" when board selection address 202 is "01" (in this case, A15="0" and A14="1"). Therefore, the response to the bus is performed and the write data is fetched. As the response signals to the bus, for example, in the case of the PCI bus, TRDY# signal and DEVSEL# signal are output to bus 100 as shown in FIG. 7.

Register address 203 is the address of register 7 which is assigned to the space of base address 201. When command signal line 104 designates write access, and both of base address coincidence signal line 205 and the register control designation line 82 are "1", register controller 6 produces the time at which the data is written to register 7 based on the timing designated by control signal line 101, so that the data on the data signal line 102 is written to the region of register 7 exhibited by register address 203.

With respect to the operation of the electronic circuit board 10, in which identification information 2="1", according to an entry of the identification information ="1", the response is "0" when board selection address 202 is "01", and both the bus control designation line 81 and the register control designation line 82 are "0", therefore, no element is activated.

On the other hand, when the data is written to the electronic circuit board 10 having identification information 2="1", board selection address 202 may be set "10". According to the truth table of FIG. 4, the response is "0" in the electronic circuit board 1 having identification information 2="0", and the response is "1" in the electronic circuit board 10 having the identification information 2="1". Therefore, the data is written only to the electronic circuit board 10 having identification information 2="1". The operation of the inside of the electronic circuit board 10 is the same as that described above.

Next, when the data is simultaneously written to the two electronic circuit boards 1 and 10, board selection address 202 is "11". According to the truth table shown in FIG. 4, with respect to the responses of the respective electronic circuit boards when board selection address 202 is "11", the response is "1" in electronic circuit board 1 in which identification information 2 is "0", and response is "0" in electronic circuit board 10 in which identification information 2 is "1", and the snoop is "*" only for the electronic circuit board 10 in which identification information 2 is "1".

As described above, since the response is "1" in electronic circuit 1, in which identification information 2 is "0", the electronic circuit board 10 fetches the data from bus 100 to write the data to the internal register 7.

While no operation is performed in the electronic circuit board, in which the is response shows "0", when the snoop is "*", electronic circuit board 10 snoops the data.

Figure 6:
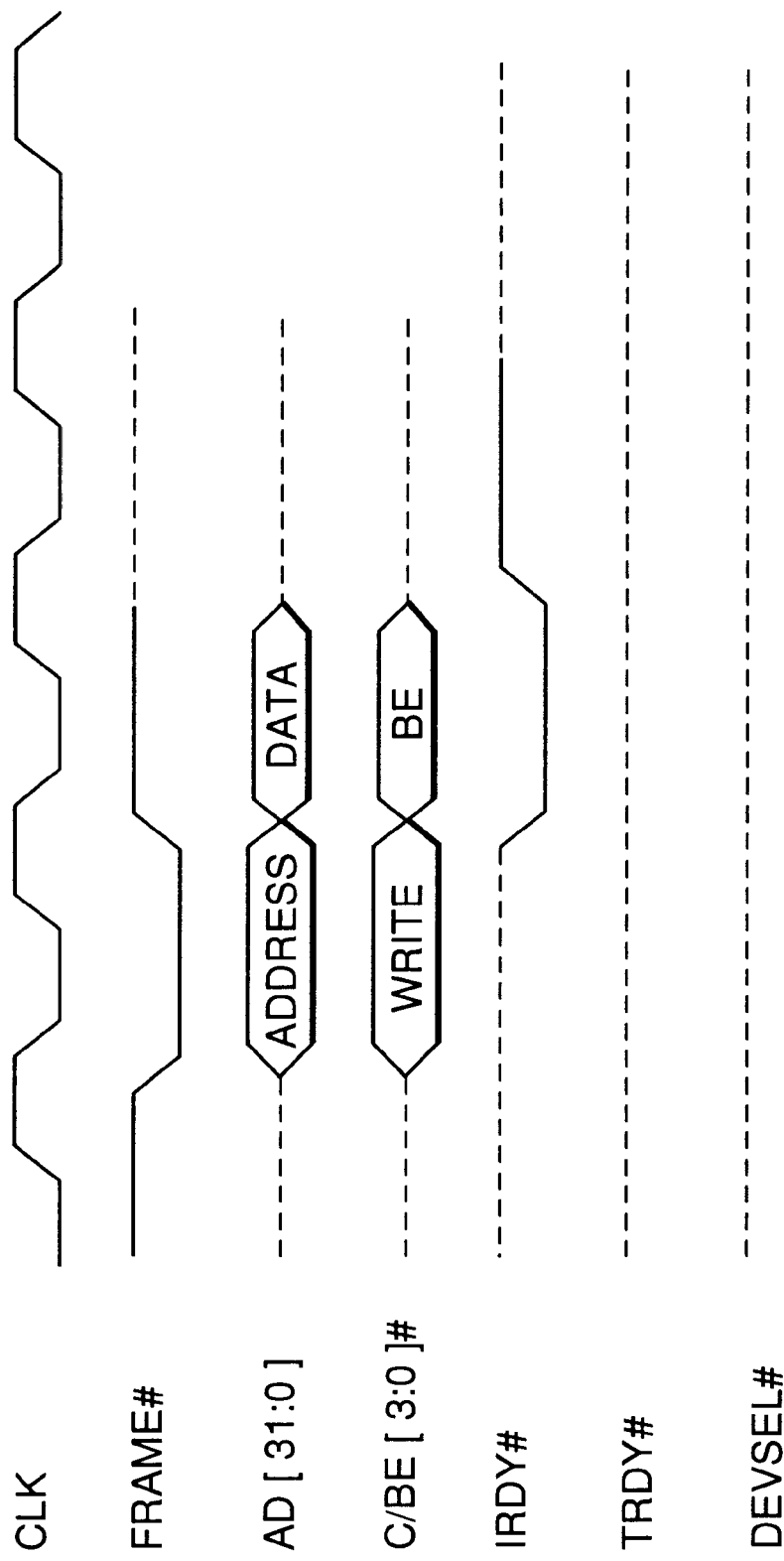
FIG. 6 is a timing diagram of an electronic circuit board having identification information 2="1" which does not assert response signals DEVSEL# and TRDY# on PCI bus.

Referring to FIG. 6, when both of address A14 (112) and address A15 (113) are "1", if identification information line 111 is "0", the bus control designation line 81 and the register control designation line 82 become "1", respectively. Thus, the response to the bus is performed and the write data is also fetched. If identification information line 111 is "1", the register control line 82 becomes "1", while the bus control line 81 becomes "0". Therefore, the data is written to register 7, but no response signal is asserted to bus 100. In PCI bus, for example, the operation of the electronic circuit board 10 having identification information 2="1", which does not assert the response signals DEVSEL# and TRDY# on the PCI bus, is shown in FIG. 6.

The actual waveforms of the signals on the PCI bus are as shown in FIG. 7, the electronic circuit board 1 having identification information 2="0" asserts the response signals DEVSEL# and TRDY# on the bus. The electronic circuit board 10 having identification information 2="1" snoops the signals on the bus and also fetches the data when the electronic circuit board 1 having identification information 2="0" fetches the data. The reason why only one electronic circuit board responds to the access to a plurality of electronic circuit boards is prevention of the bus fight.

In the manner as described above, the data can be simultaneously written to the two electronic circuit boards.

In the embodiment, while the data is simultaneously written to the two sheets of electronic circuit boards which are connected to the bus, it should be noted that the number of electronic circuit boards connected to the bus is not limited thereto. For example, if the three electronic circuit boards are connected to the bus, the address structure is configured as shown in FIG. 7, and identification comparator 8 is designed based on the truth table shown in FIG. 8. The data can be simultaneously written to arbitrary electronic circuit boards out of the three electronic circuit boards.

In the truth tables shown in FIGS. 3 and 8 and the logical circuit shown in FIG. 4, the logic is designed in such a way that the electronic circuit board having the smallest identification information responds to the bus while other electronic circuit boards snoop the signals when the data is simultaneously written to a plurality of electronic circuit boards. The electronic circuit board which respond to the bus and the electronic circuit boards which snoop the data are not specified at all.

As described above, when writing the same data to a plurality of electronic circuit boards, the same data can be written to the desired electronic circuit boards. This is because a part of the addresses is assigned to the bit which is used to select the electronic circuit board to which the data is to be written, and the electronic circuit board to which the data is to be written is specified based on the content of the bit.

In addition, the sequence which is used to specify the electronic circuit board for snooping the data becomes unnecessary. This is because a part of the addresses is assigned to the bit which is used to select the electronic circuit board to which the data is to be written, and the identification information, which is different for every electronic circuit board, is compared with the selected electronic circuit board, whereby it is possible to determine whether or not the present electronic circuit board snoops the data.

Next, a second embodiment of the present invention will be described in detail.

Figure 9:
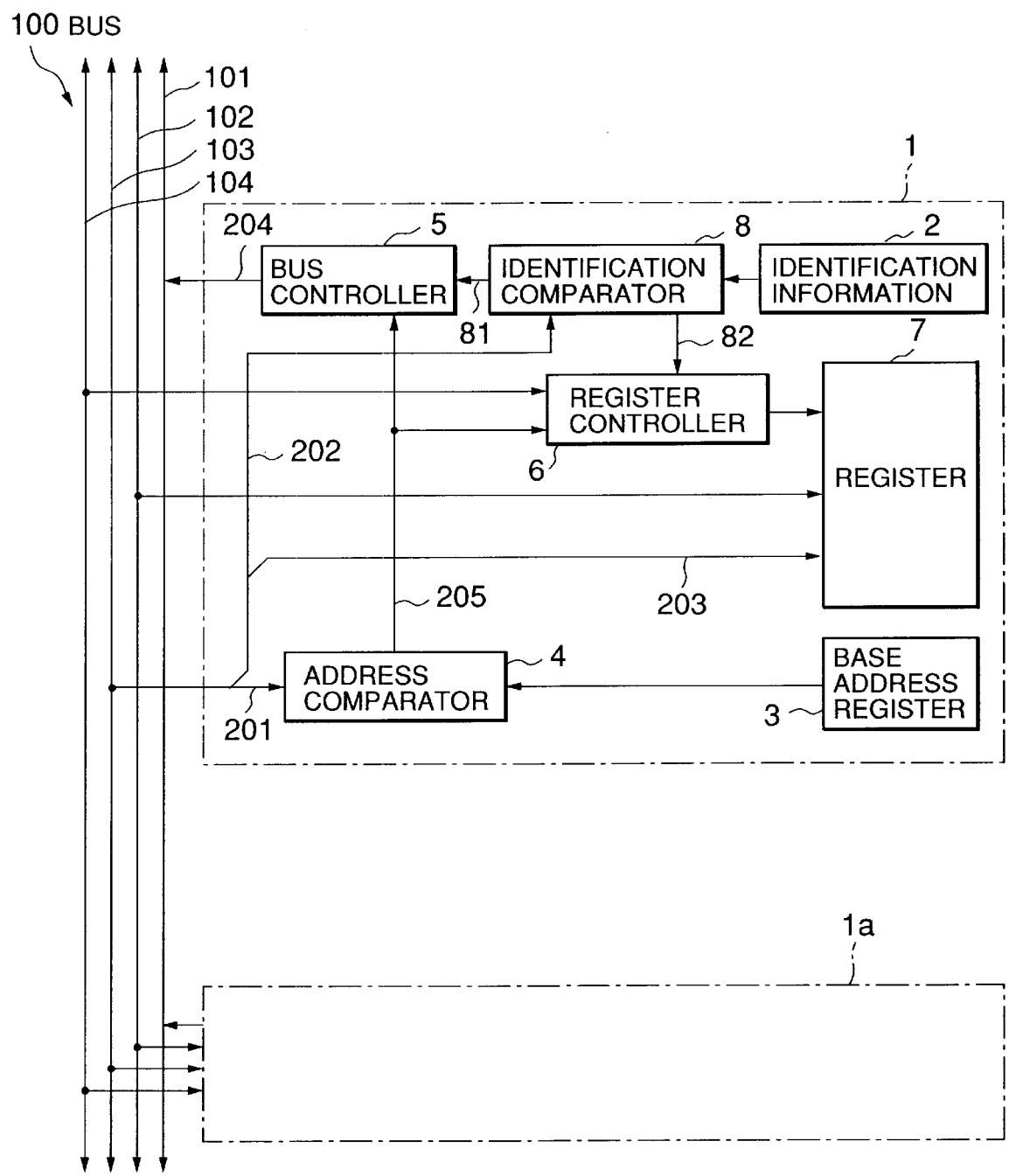
FIG. 9 is a block diagram of the second embodiment of the present invention.

In FIG. 9, identification information 2 is provided in the inside of an electronic circuit board 1a. Other configurations and the basic operation of the snoop control circuit of the second embodiment are the same as those of the first embodiment. Identification information 2 is a register which is assigned to a region that is different from the region of register 7 of each of the electronic circuit boards. When the electronic circuit board 1 is initialized, the identification is assigned to the register for identification information 2. The operation of writing the data to the electronic circuit boards is identical to that of the electronic circuit boards of the first embodiment except that the physical position of identification information 2 is changed.

In this embodiment, the desired value for identification information 2 can be set by the writing operation of the bus. When the number of electronic circuit boards 1 increases, or the electronic circuit board 1 is switched to another electronic circuit board 1, identification information 2 may be set automatically.

Since the desired value can be set to identification information 2 it is easy to change the electronic circuit board 1 which responds to the bus. For example, when the electronic circuit board 1, which has responded to the bus fails, this electronic circuit board is abandoned and identification information 2 of another electronic circuit is set so that another electronic circuit board replaces the failed electronic circuit board and responds to the bus. The failed electronic circuit board can then be disconnected from the bus.

As described above, the bus snoop control circuit has a circuit which determines whether or not a bus snoop control circuit snoops data based on an address obtained from a bus. Therefore, the data transfer and the selection of the electronic circuit board as an object for the data write can be performed at the same time, and it becomes possible to flexibly change the electronic circuit board which snoops the data and the electronic circuit board which does not snoop the data.

While this invention has been described in conjunction with the preferred embodiments described above, it will now be possible for those skilled in the art to put this invention into practice in various other manners.

What is claimed is:

1. A bus snoop control circuit connected to a bus comprising:
   an input which inputs an address from said bus; and
   a first circuit which determines whether or not said bus snoop control circuit snoops data based on said address.

2. The bus snoop control circuit as claimed in claim 1, wherein said first circuit determines whether or not said bus snoop control circuit snoops data based on the comparison between a part of said address, which designates whether or not said bus snoop control circuit is accessed, and information which identifies said bus snoop control circuit.

3. The bus snoop control circuit as claimed in claim 2, wherein said information, which identifies said bus snoop control circuit, is stored in a first element which is coupled to said bus snoop control circuit.

4. The bus snoop control circuit as claimed in claim 2, further comprising a first element which stores said information which identifies said bus snoop control circuit.

5. The bus snoop control circuit as claimed in claim 1, wherein said first circuit determines whether or not said bus snoop control circuit outputs a response to said bus based on said address.

6. The bus snoop control circuit as claimed in claim 5, wherein said first circuit determines that said bus snoop control circuit snoops said data unless said first circuit determines that said bus snoop control circuit outputs said response to said bus.

7. The bus snoop control circuit as claimed in claim 1, further comprising:
   a first register which holds a base address; and
   a second circuit which determines that said base address is identical to a base address included in said address and activates an operation to said bus snoop control circuit.

8. A bus system comprising:
   a bus;
   a plurality of circuit boards; and
   a plurality of first circuits each of which is provided in each of said circuit boards and determines whether or not a corresponding one of said circuit boards snoops data based on an address obtained from said bus.

9. The bus snoop control circuit as claimed in claim 8, wherein each of said first circuits determines whether or not a corresponding one of said circuit boards snoops data based on the comparison between a part of said address which designates whether or not a corresponding one of said circuit boards is accessed and information which identifies corresponding one of said circuit boards.

10. The bus snoop control circuit as claimed in claim 9, wherein said part of said address, which designates whether or not each of said bus snoop control circuits is accessed, includes bits corresponding to the number of said boards.

11. The bus snoop control circuit as claimed in claim 9, wherein said information, which identifies a corresponding one of said circuit boards, is stored in a first element which is coupled to corresponding one of said circuit boards.

12. The bus snoop control circuit as claimed in claim 9, further comprising first elements each of which is provided in said circuit boards and stores said information which identifies said circuit board.

13. The bus snoop control circuit as claimed in claim 8, wherein said first circuit determines whether or not a corresponding one of said circuit boards outputs a response to said bus based on said address.

14. The bus snoop control circuit as claimed in claim 13, wherein said first circuit determines that one of said boards outputs said response to said bus and the other boards snoop said data when two or more said boards are designated to be accessed.

15. The bus snoop control circuit as claimed in claim 13, wherein said first circuit determines that a corresponding one of said circuit boards snoops said data unless said first circuit determines that a corresponding one of said circuit boards outputs said response to said bus.

16. The bus snoop control circuit as claimed in claim 8, wherein each of said boards further comprises:
   a first register which holds a base address; and
   a second circuit which determines that said base address is identical to a base address included in said address and activates an operation to said circuit board.

17. A method for controlling a snoop in a circuit board connected to a bus comprising:
   obtaining an address from said bus; and
   determining whether or not said board snoops data based on said address.

18. The method as claimed in claim 17, further comprising:
   determining whether or not said circuit board outputs a response to said bus based on said address.

* * * * *